United States Patent
Siskos

(10) Patent No.: US 7,437,892 B2
(45) Date of Patent: Oct. 21, 2008

(54) APPARATUS HAVING VACUUM APPLYING FACILITIES AND METHOD OF USING VACUUM TO BEND AND/OR SHAPE ONE OR MORE SHEETS

(75) Inventor: William R. Siskos, Delmont, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 442 days.

(21) Appl. No.: 10/828,939

(22) Filed: Apr. 21, 2004

(65) Prior Publication Data

US 2005/0235698 A1    Oct. 27, 2005

(51) Int. Cl.
C03B 23/02      (2006.01)
C03B 23/03      (2006.01)
C03B 23/035     (2006.01)

(52) U.S. Cl. ............................ 65/287; 65/106; 65/181.1
(58) Field of Classification Search ................... 65/106, 65/181.1
See application file for complete search history.

(56) References Cited

U.S. PATENT DOCUMENTS

| | | | | |
|---|---|---|---|---|
| 3,595,636 A * | 7/1971 | Posney et al. | .................. | 65/287 |
| 3,778,244 A | 12/1973 | Nedelec et al. | .................. | 65/106 |
| 3,846,402 A | 11/1974 | Seymour | .................. | 65/104 |
| 4,260,408 A | 4/1981 | Reese et al. | .................. | 65/106 |
| 4,260,409 A | 4/1981 | Reese et al. | .................. | 65/273 |
| 4,265,650 A | 5/1981 | Reese et al. | .................. | 65/104 |
| 4,597,789 A | 7/1986 | Reese | .................. | 65/106 |
| 4,859,225 A | 8/1989 | Kuster et al. | .................. | 65/104 |
| 5,017,210 A * | 5/1991 | Petitcollin et al. | .................. | 65/106 |
| 5,376,158 A * | 12/1994 | Shetterly et al. | .................. | 65/106 |
| 5,383,947 A * | 1/1995 | Montonen | .................. | 65/25.4 |
| 5,437,703 A * | 8/1995 | Jacques et al. | .................. | 65/106 |
| 5,713,976 A * | 2/1998 | Kuster et al. | .................. | 65/106 |
| 5,820,650 A | 10/1998 | Yamazaki | .................. | 65/104 |

(Continued)

FOREIGN PATENT DOCUMENTS

EP    0838438 A1    4/1998

(Continued)

OTHER PUBLICATIONS

U.S. Appl. No. 10/706,884 filed Nov. 12, 2003.

Primary Examiner—Steven P. Griffin
Assistant Examiner—Jason L. Lazorcik
(74) Attorney, Agent, or Firm—Andrew C. Siminerio

(57) ABSTRACT

One or more sheets, e.g. two glass sheets heated to their deformation temperature are shaped by positioning the sheets on a sheet supporting surface of an outline mold. The outline mold and press face of a shaping member are moved relative to one another to bias the marginal edge portions of the upper sheet against the press face to establish an enclosure around the peripheral edges of the sheets. Vacuum is applied to the peripheral edges of the sheets to pull the air from between the sheets, and from between the press face and adjacent sheet surface as positive or atmospheric pressure is applied to bottom sheet to move the sheets against the press face. Optionally a vacuum can be pulled through passageways in the press face during the shaping of the sheets and pressurized air moved through the passageways after the sheets are shaped to move the sheets away from the press face.

18 Claims, 9 Drawing Sheets

U.S. PATENT DOCUMENTS

| | | | | |
|---|---|---|---|---|
| 6,082,141 | A | 7/2000 | Kuster | 65/289 |
| 6,138,477 | A | 10/2000 | Morin | 65/107 |
| 6,276,173 | B1 * | 8/2001 | Vanhuysse et al. | 65/374.12 |
| 6,629,436 | B1 * | 10/2003 | Skeen et al. | 65/107 |

FOREIGN PATENT DOCUMENTS

EP  0838438 B1  1/2005

* cited by examiner

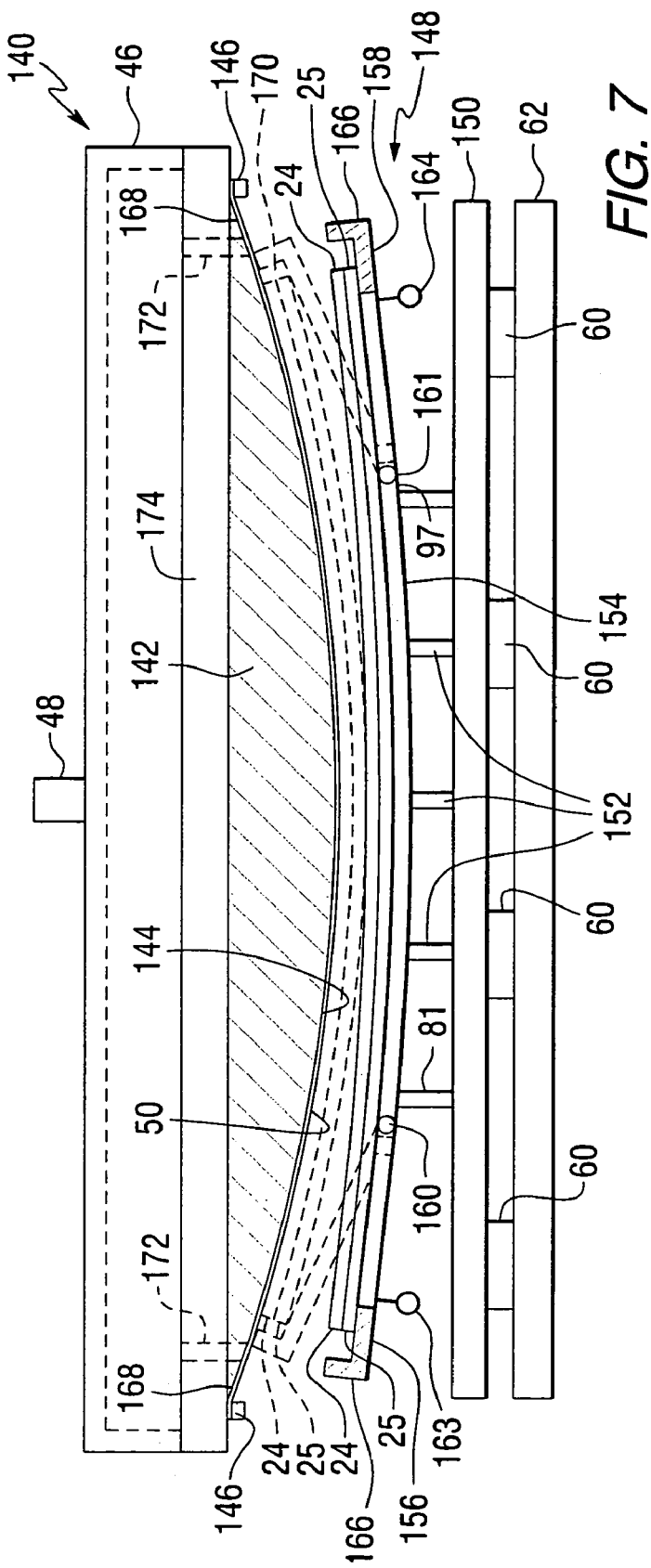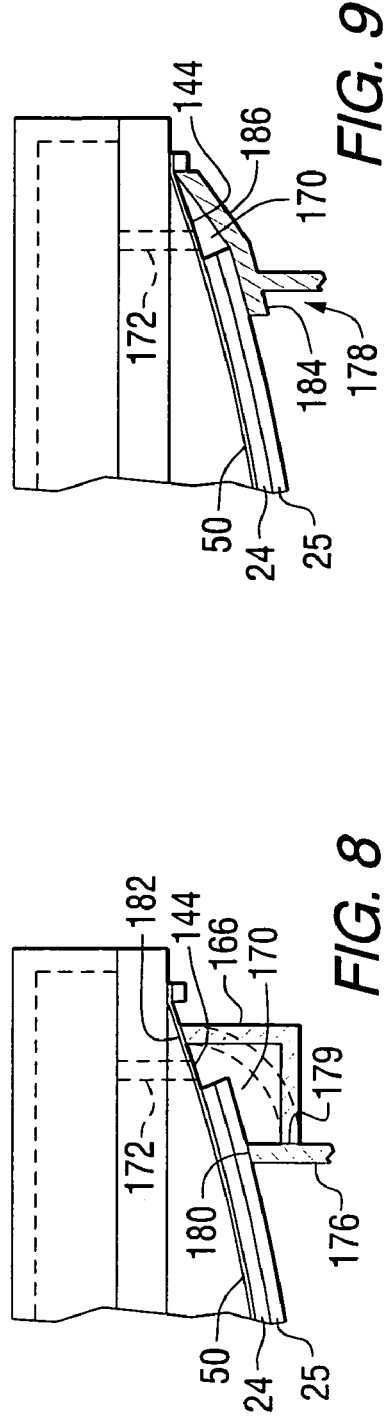

APPARATUS HAVING VACUUM APPLYING FACILITIES AND METHOD OF USING VACUUM TO BEND AND/OR SHAPE ONE OR MORE SHEETS

BACKGROUND OF THE INVENTION

1. Field of the Invention

This invention relates to an apparatus having vacuum applying facilities and method of using vacuum to bend and/or shape one or more sheets, e.g. a pair of glass sheets to be laminated, and more particularly, this invention relates to the simultaneous shaping of a pair of glass sheets by a combination of gravity sag bending, press bending and negative air pressure.

2. Discussion of the Technology

The desire of automotive designers to have windshields with more complicated bends and deeper sags, and the requirement that the windshield conform to a predetermined surface profile over its entire extent, places demands on the glass fabricator to produce more difficult shaped glass parts with more stringent tolerances. Such complicated shapes are desired for vehicle styling purposes and for fuel economy, e.g. reduction of air friction. To achieve these objectives, the shape of the glass part is required to meet tight tolerances to enable the shaped glass sheets, e.g. shaped laminated windshields to be mounted in a curved mounting frame forming part of an automobile body to merge the windshield with the shape of the curved mounting.

U.S. patent application Ser. No. 10/706,884 filed on Nov. 12, 2003, in the names of James H. Schwartz et al. for "APPARATUS AND METHOD FOR BENDING GLASS SHEETS" discloses the use of a ring or outline mold having pressure applying facilities to shape glass sheets to complicated shapes by sag bending, press bending and static air pressure while minimizing marking of the glass sheets during the bending operation to shape the sheets. Although the mold arrangement disclosed in the above-mentioned patent application has the capabilities to shape one or more glass sheets to meet today's complicated shapes and optical standards, there are limitations. More particularly, the modification to the outline mold, and the equipment, to apply the static air pressure adds additional expense to the cost of the bending equipment.

As can be appreciated by those skilled in the art of shaping glass sheets, it would be advantageous to provide an inexpensive apparatus for, and method of, shaping one or more glass sheets to complicated shapes while minimizing marking and optical defects of the glass sheets during the bending operation to shape the sheet(s).

SUMMARY OF THE INVENTION

This invention relates to an apparatus for bending sheets, e.g. but not limiting to the invention, a pair of heated glass sheets. The apparatus includes a first shaping mold having a major surface, a portion of the major surface including a shaping member having a predetermined shaped press face; an outline or perimeter shaping mold, e.g. a second mold, the second mold having a pair of spaced end rails and a pair of spaced central rails between the spaced end rails. The pair of spaced end rails and the pair of spaced central rails define a boundary around an open area with portions of the end rails and the central rails providing a sheet supporting surface, and an outer wall between the first and second molds. The outer wall defines a boundary with the sheet supporting surface within the boundary. An elevator arrangement acts on at least one of the first and second molds to move the first and second molds relative to one another to a first position where the first and second molds are spaced from one another and the outer wall is spaced from at least one of the first and second molds, and to a second position where the first and second molds, and the outer wall form an enclosure having the sheet supporting surface of the second mold and the shaping member of the first mold facing the enclosure. Ambient air is moveable into the enclosure at least through the open area. At least one passageway other than the open area has a first end in fluid contact with the enclosure and the second opposite end outside the enclosure.

In non-limiting embodiments of the invention, the end rails and the central rails of the second mold are continuous and form a continuous sheet supporting surface, or the central rails are secured in position and the end rails are pivotally mounted to pivot from a first position where the end rails and the central rails provide for a generally horizontal support for a sheet to a second position where portions of the ends of the end rails are raised above the central rails.

The invention includes the outer wall mounted to a second major surface of the first mold, the outer wall surrounding and spaced from the shaping member and/or the outer wall is mounted to the central rails and the end rails. In non-limiting embodiments, the outer wall has one part of an aligning arrangement and the first mold and/or the second mold has another part of the aligning arrangement.

The shape of the rails is not limiting to the invention and can include the central rails and the end rails having a "T" shaped cross section defined as a "T" rail with the horizontal member of the "T" rail having the sheet supporting surface. The outer wall can be connected to the outer surface of the horizontal member of the "T" rail and extends away from the "T" rail and the open area, or the outer wall can be connected to the vertical member of the "T" rail and extends away from the "T" rail and the open area. The sheet supporting surface can be a portion of the horizontal member of the "T" rail adjacent the open area and the outer wall can be the portion of the horizontal member of the "T" farthest from the open area.

In another non-limiting embodiment of the invention, the central rails and the end rails have an "I" shaped cross section defined as an "I" rail and the upper end of the "I" rail is the sheet supporting surface and the outer wall has one end mounted to outer vertical surface of the "I" rail and extends away from the "I" rail and the open area.

Non-limiting embodiments of the first shaping mold include a plate member having a first major surface and a second opposite major surface wherein the major surface of the first mold having the shaping member is the second surface of the plate member and the shaping member extends away from the second surface of the plate member, a plenum over a portion of the first surface of the plate member; the at least one passageway is one of a plurality of spaced passageways with selected ones of the plurality of the passageways having the first end in fluid contact with the interior of the enclosure at positions spaced from the shaping member and the second end in fluid contact with interior of the plenum; the first shaping mold further comprising a plate member having a first major surface and a second opposite major surface wherein the major surface of the first mold having the shaping member is the second surface of the plate member, and the shaping member extends away from the second surface of the plate member. A plenum covers a portion of the first surface of the plate member, and the at least one passageway is one of a plurality of spaced passageways with selected ones of the plurality of the passageways having the first end in fluid contact with the interior of the enclosure at positions along the marginal edge portions of the shaping member and the second end in fluid contact with the plenum interior.

Non-limiting embodiments of the passageway include a plurality of passageways with selected ones of the passageways having the first end adjacent peripheral edge of the shaping member of the first mold when the first and second molds and the outer wall are in the second position with the body of the selected ones of the passageways passing through the outer wall and the second end of the selected ones of the passageways at or extending beyond the outer surface of the outer wall. In another non-limiting embodiment selected ones of the passageways have the first end adjacent peripheral edges of the shaping member when the first and second molds and the outer wall are in the second position with the body of the selected ones of the plurality of passageways passing through the second mold, and the second end of the selected ones of the plurality of passageways accessible from the exterior of the second mold.

Non-limiting embodiments of the shaping member include the shaping member having a press face and the at least one passageway is one of a first plurality of passageways and further including a second plurality of passageways. The second plurality of passageways have a first end at the press face of the shaping member, and the body of the passageways passing through the shaping member. A first plenum is in fluid communication with the second end of the first plurality of passageways and a second plenum is in fluid communication with the second end of the second plurality of passageways; the second plenum can be inside the first plenum, or the first and second plenums can be alongside one another. The first plenum is connected by a conduit to a vacuum pump or vacuum blower, and the second plenum is connected by a conduit to a second vacuum pump or vacuum blower, or in the alternative connected to a valve having a first open position and a second open position with the valve in the first open position connected by a conduit to the vacuum blower and with the valve in the second position connected by a conduit to a pressurized fluid system.

In another non-limiting embodiment of the invention, the first mold is mounted in a pressing station, the pressing station having an upstream end and a downstream end and a heating furnace connected to the upstream end of pressing station. A cooling furnace is connected to the downstream end of the pressing station, and a conveying system extends through the heating furnace, the pressing station and the cooling furnace to move the second mold along a path through the heating furnace, the pressing station and the cooling furnace. The pressing station further includes an upper reciprocating rod, e.g. a piston or a pipe to move the first mold toward and away from the portion of the conveying system in the pressing station and a lower piston moveable toward and away from the first mold. The second mold is mounted on a carriage moved by the conveying system along the path into the pressing station in the second position. Thereafter the lower piston moves the second mold toward the first mold to position the second mold, the first mold and the outer wall in the first position.

The invention further relates to a sheet bending apparatus having a chamber having outer walls, an entrance end, an exit end, an entrance door and an exit door. A first shaping mold is mounted in the chamber, the first shaping mold having a major surface and having a shaping member having a predetermined shaped press face. An outline shaping mold defined as a second mold is mounted in the chamber in facing relationship to the first mold, the second mold having a pair of spaced end rails and a pair of spaced central rails between the spaced end rails wherein portions of the end rails and the central rails provide a sheet supporting surface with an open area within the boundary of the sheet supporting surface. An elevator arrangement acts on at least one of the first and second molds to move the first and second molds relative to one another to a sheet receiving position where the first and second molds are spaced from one another, and to a sheet pressing position where the first and second molds are closer to one another than when in the first position. A vacuum pump or vacuum blower is connected to the interior of the pressing chamber, and a conduit having one end connected to the open area between the shaping rails and the opposite end connected to an air supply, e.g. the atmosphere outside the chamber.

The invention further relates to a pressing mold, e.g. the first shaping mold discussed above having a mesh cloth securely mounted over the press face. The mesh cloth having a predetermined spacing between the ends, wherein the first end of the second plurality of passageways is equal to or less than the spacing of the mesh cloth overlying the second end of the second plurality of passageways. The second plurality of passageways, in one non-limiting embodiment has a second end opposite the first end and at least one of the passageways of the second plurality of passageways has a first end opening greater than second end opening at the press face and further comprising a plate having a plurality of spaced holes there through mounted in the second end opening of the at least one of the second plurality of passageways.

Still further, the invention relates to a method of bending a sheet or sheets by engaging marginal edge portions of a major surface defined as the first major surface of a stack of one or more sheets; moving opposite major surface of the stack of sheets defined as the second major surface against the press face of a shaping member; applying a vacuum to peripheral edges of the stack to at least pull air from between the press face and the second major surface, while applying pressure, e.g. atmospheric pressure or higher to the first major surface to bias the stack against the press face of the shaping member to bend the stack of sheets to a predetermined shape.

In another non-limiting embodiment of the invention, after the sheets are shaped they are laminated to provide a laminated automotive window.

The invention further relates to an automotive window made using the bending apparatus, and practicing the method of the invention.

BRIEF DESCRIPTION OF THE DRAWING

FIG. 7 is a view similar to the view of FIG. 2 showing another non-limiting embodiment of upper and lower molds of the invention for shaping sheet in accordance with the disclosure of the invention.

FIG. 8 is a fragmented cross sectional end view showing a non-limiting embodiment of the invention to provide an enclosure between upper and lower molds in accordance with the disclosure of the invention.

FIG. 9 is a view similar to view of FIG. 8 showing another non-limiting embodiment of the invention for establishing an enclosure between upper and lower molds in accordance with the disclosure of the invention.

FIGS. 14A and 14B is a longitudinal side view of a glass sheet bending lehr arrangement in accordance with the present invention. FIG. 14A shows the portion of the lehr arrangement upstream of the press bending station and FIG. 14B shows the portion of the lehr arrangement downstream of the press bending station.

DETAILED DESCRIPTION OF THE INVENTION

Figure 1:
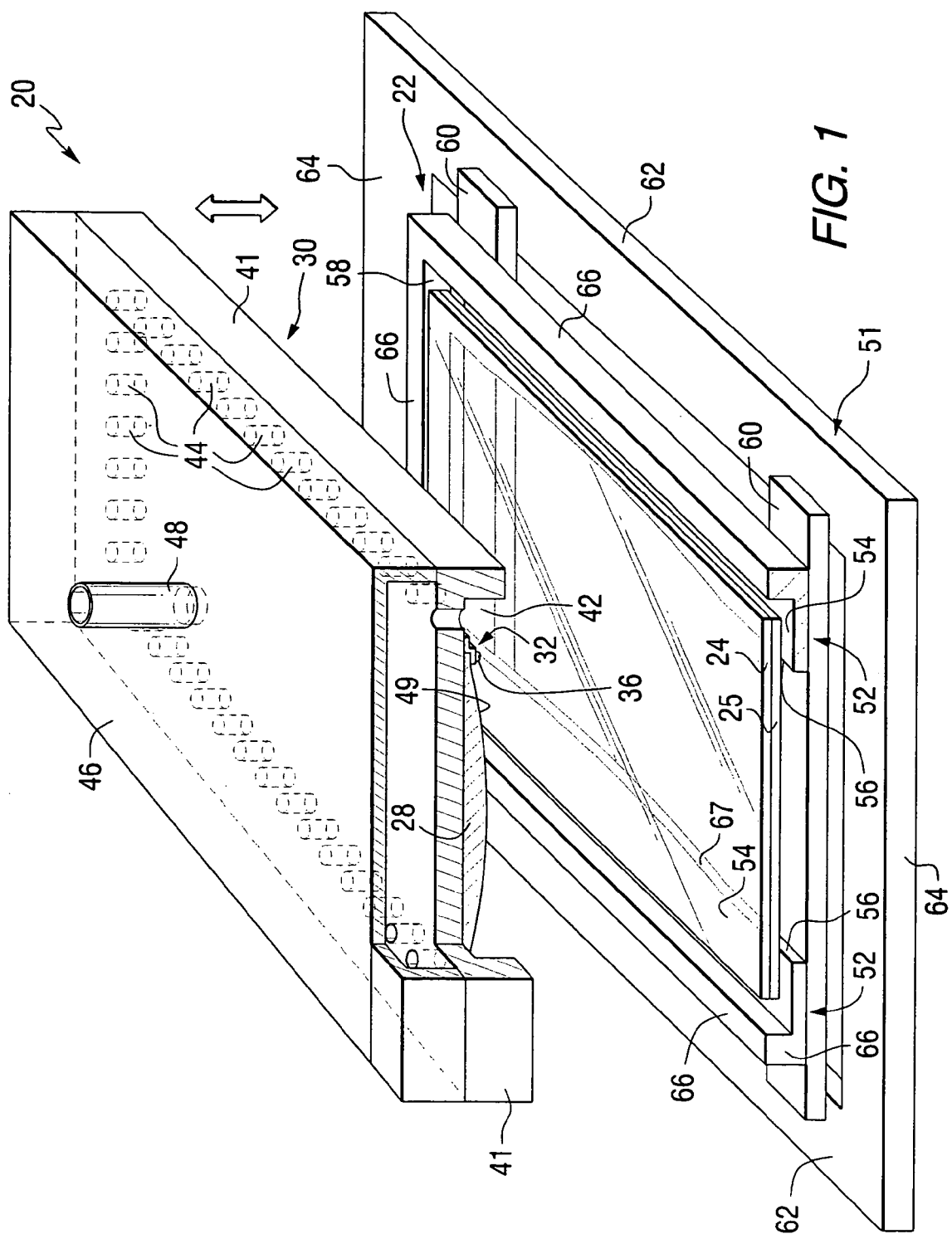
FIG. 1 is a partial cross-sectional view of an orthographic projection of an upper shaping mold spaced from a lower shaping mold, the upper and lower molds incorporating non-limiting embodiments of the invention.

The present invention relates to bending and/or shaping one or more pliable sheets, e.g. but not limited to simultaneous shaping a stacked pair of glass sheets, or doublets, for a windshield. As is appreciated by those skilled in the art of bending and/or shaping sheets, the invention can be practiced to shape any number of sheets of any heat softenable sheet material where it is desired that the sheets be precisely and accurately shaped, and marking of the sheets during the bending and/or shaping of the sheets is minimized, if not eliminated. Although in the following discussion the simultaneous bending and/or shaping of a pair of glass sheets is performed by a combination of gravity sag bending, press bending and applying negative pressure, the invention is not limited thereto, and the bending and/or shaping of the glass sheets can be accomplished by using negative pressure alone and/or in combination with any press bending and/or shaping equipment or process.

In the following discussion of non-limiting embodiments of the invention, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the practice of the invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, and all subranges in between, e.g. 1 to 6.3, or 5.5 to 10, or 2.7 to 6.1. Also, as used herein, terms such as "positioned on" or "supported on" mean positioned or supported on but not necessarily in direct surface contact with. For example, a glass sheet "positioned on" a shaping rail does not preclude the presence of one or more other materials located between the sheet and the surface of the rail.

Further, in the discussion of the non-limiting embodiments of the invention, it is understood that the invention is not limited in its application to the details of the particular embodiments shown and discussed since the invention is capable of other embodiments. Further the terminology used herein is for the purpose of description and not of limitation, and unless indicated otherwise, like reference numbers refer to like elements.

In general, the invention relates to, among other things, equipment and method to provide an enclosure around one or more sheets, e.g. a pair of stacked glass sheets in a fixed relationship to a press face of a mold, e.g. an upper mold, and evacuating the air from between the press face and the surface of the adjacent glass sheet to bias the glass sheets against the press face of the upper mold to shape the glass sheets. The biasing action for purposes of the discussion and not limiting to the invention is the result of negative pressure between the press face of the upper mold and the surface of the adjacent sheet, and relatively positive pressure acting on the glass sheet surface farthest from the press face. In the preferred non-limiting embodiments of the invention discussed below, during the practice of the invention, the enclosure is provided by an upper mold, an outline or ring mold, an outer wall between the upper and lower molds and the sheet(s) supported on the shaping rails of the outline mold. In the preferred non-limiting embodiments of the invention discussed below, the components of the apparatus that provide the enclosure is an upper mold, an outline or ring mold, an outer wall between the upper and lower molds. Without the presence of the sheets, the sheet supporting surface of the lower mold acts as a boundary defining an open area. As is appreciated, the invention is not limited to the orientation or location of the components of the apparatus, e.g. the upper mold can be a lower mold and the enclosure can be a bending station as discussed below.

Figure 2:
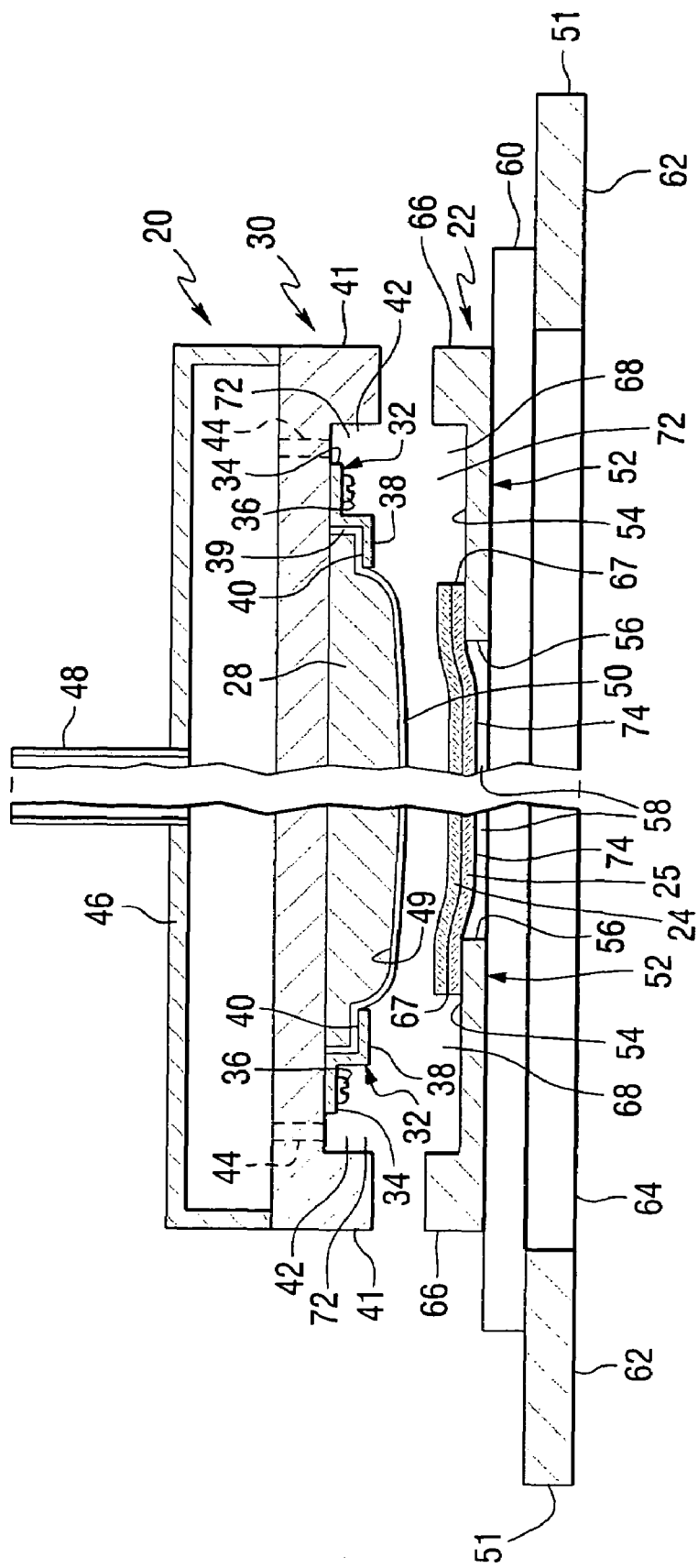
FIG. 2 is a cross sectional end view of the upper and lower molds illustrated in FIG. 1 with the sidewalls of the molds in the contact with one another to form an enclosure in accordance to the disclosure of the invention.

Referring to FIGS. 1 and 2, there is shown an upper shaping mold 20 and a lower ring or outline mold 22 used in the practice of the invention to bend and/or shape a pair of heated glass sheets, e.g. an upper glass sheet 24 and a lower glass sheet 25. As can be appreciated, the invention is not limited to any particular upper mold and/or lower ring or outline mold design and any upper mold and/or lower ring or outline mold design may be used in the practice of, and/or accomplish the function and cooperation of the elements, of the invention.

The upper shaping mold 20 includes a shaping member 28 secured to a plate member 30 by a plurality of spaced "Z" shaped securing members 32 (two members 32 clearly shown in FIG. 2) having outer leg 34 secured to the plate member 30 by one or more screws 36 and other outer leg 38 forming a groove 39 with the plate member 30 to receive marginal edge portions 40 of the shaping member 28 as shown in FIGS. 1 and 2. The plate member 30 has a continuous peripheral sidewall 41 surrounding, and spaced from the shaping member 28 to provide an upper mold channel 42 for moving fluid, e.g. air, gas, etc. away from the shaping member 28 through passageways 44 in the plate member 30. The passageways 44 extend through the plate member 30 to provide fluid communication between the upper mold channel 42 and the interior of plenum 46 mounted on and secured to the plate member 30. A vacuum is established in the plenum 46 by pulling a fluid, e.g. gas and/or air through a conduit 48 (see FIG. 1) having one end connected to the plenum 46 and the other end connected to vacuum equipment (see FIG. 10). In the following discussion, the fluid will be referred to as air, however, as is appreciated by those skilled in the art, the fluid may be any type of gas and/or air having any composition of gases.

The shaping member 28 includes a lower press face 49, preferably but not limiting to the invention, a metal or ceramic press face. The press face 49 covers a continuous area whose outline is slightly larger than the outline of the glass sheets 24 and 25 supported on the lower mold 22. The downwardly facing press face 49 of the upper shaping member 28 of the upper mold 20 is generally convex downward in elevation, i.e. convex surface of a solid as shown in FIG. 2 and the shape of the press face defines the desired glass surface contour about the periphery of the glass sheets 24 and 25 as well as the desired contours of the central region of the glass sheets. Depending on the complexity of the shape to be imparted to the glass sheets, the press face 49 can further include an S-shaped bend component in elevation in the direction of the length of the lehr (to be discussed below) to conform to a desired transverse component of bend.

The press face 49 can be covered with one or more layers of heat resistant cloth or metal fabric 50 (see FIG. 2) that does not mark the hot glass sheets, e.g. the surface of the glass sheet 24 contacting the shaping member during the press bending operation. Although not limiting in the present invention, in one non-limiting embodiment, the press face 49 is covered with one layer of fiberglass press cloth #S-1NS7L90062301 commercially available from GlassTech, Perrysburg, Ohio, covered by one layer of stainless steel knitted press cloth #3KN/C3 commercially available from Bekaert Fibre Technologies, Marietta, Ga.

The lower ring or outline mold 22 shown in FIGS. 1 and 2 is a fixed rail outline mold having a continuous shaping rail 52, i.e. a continuous central portion 56 and end portions 58, and having a sheet supporting surface 54. The sheet supporting surface 54 conforms in elevation and outline to the longitudinal and transverse elevational shape desired slightly inboard of the glass sheet perimeter for the glass sheets 24 and 25 to be bent. Fixed rail outline molds are well known in the art and no further discussion is deemed necessary; however, for a more detailed discussion of fixed rail outline molds reference can be made to U.S. Pat. Nos. 3,846,104; 4,260,408; 4,260,409 and 4,265,650, which patent disclosure is hereby incorporated by reference. The outline mold 22 is positioned relative to the carriage 51 so that the mold's geometric center is generally aligned with the geometric center of the upper shaping mold 20 when the carriage 51 is aligned for shaping the sheets, e.g. aligned in a press bending station and the outline mold 22 is in a processing position, as will be discussed later in more detail. In the non-limiting embodiment of the invention shown in FIGS. 1 and 2, the outline mold 22 is supported and secured to the carriage 51 by a plurality of cross members 60 extending between transverse struts 62 of the carriage 51 with the transverse struts 62 maintained in spaced relation by a pair of spaced struts 64 and the cross members 60. Outline mold 22 is secured to the cross members 60, and the cross members 60 secured to the struts 62 in any convenient or usual manner.

As shown in FIGS. 1 and 2, the outer marginal edges of the shaping rail 52 have a peripheral sidewall 66 that cooperates with the peripheral edges 67 of the glass sheets 24 and 25 to provide a channel 68 around the glass sheets 24 and 25. The peripheral sidewall 41 of the upper mold 20 and the peripheral sidewall 66 of the outline mold 22 are sized such that with the sidewalls 41 and 66 of the upper and lower molds, respectively contacting one another as shown in FIG. 2, the supporting surface 54 moves the sheets 24 and 25 against the press face 49, and the sidewalls 66 of the outline mold 22, the glass sheets 24 and 25 supported on shaping surface of the shaping rail 52, and the upper mold 20 form an enclosure 72 (shown in FIG. 2). More particularly, the interior of the enclosure is bound by the glass sheets 24 and 25, the shaping rail 52, the sidewall 66 of the outline mold 22, and the sidewall 41 of the plate member 30 of the upper mold 20. When vacuum is pulled through the conduit 48, air is pulled through the conduit 48, the plenum 46, the passageways 44 and the enclosure 72 to establish a negative air pressure in the enclosure 72. As can be appreciated by those skilled in the art, the invention is not limited by measuring the pressure in the chamber by using gage pressure measurement. More particularly, gage pressure assumes that one local atmosphere, i.e. the pressure of the atmosphere where the measurements are being made is zero pressure (pounds per square inch gage (psig)). The invention contemplates measuring the pressure in the chamber using absolute pressure, i.e. the pressure of a perfect vacuum is zero and one atmosphere is 14.7 pounds per square inch absolute (psia) at sea level.

As the negative air pressure is being established in the enclosure 72, air is pulled from between the press face 49 of the shaping member 28 and the upper sheet 24, and from between the sheets 24 and 25. The negative pressure in the enclosure results in a net pressure difference between the lower surface 74 of the lower sheet 25 and all the other surfaces of the sheets of glass. The pressure on surface 74 is higher and thus urges or biases the glass sheets 24 and 25 upward against the press face 49 of the shaping member 28 to shape or complete the shaping of the glass sheets. The biasing of the sheets 24 and 25 against the press face 49 also assists in the removal of air, if any, between the sheets and between the sheet 24 and the press face 49 of the shaping member.

As can be appreciated by those skilled in the art, the further the sheets are from the press face, the higher the negative pressure in the enclosure to bias the glass sheets against the press face. Although not limiting to the invention, in the practice of the invention it is preferred to have the peripheral sidewall 41 of the upper mold 20 and the peripheral sidewall 66 of the outline mold 22 sized such that with the sidewalls 41 and 66 of the upper and lower molds, respectively, contacting one another as shown in FIG. 2, the supporting surface 54 moves the peripheral edges of the sheets 24 and 25 against the press face 49.

The invention is not limited to the arrangement and cooperation of the peripheral sidewall 41 of the plate member 30 of the upper mold and the peripheral sidewall 66 of the shaping rail 52. For example, shown in FIGS. 3-6 are non-limiting embodiments of the invention of various types of sidewalls that may be used in the practice of the invention.

Figure 3:
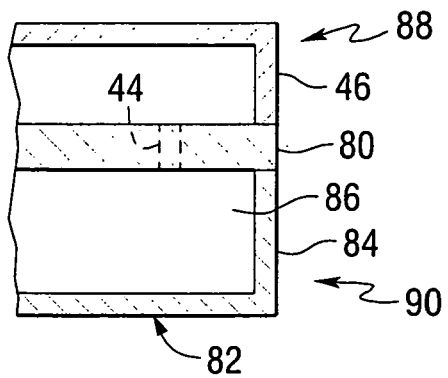
FIGS. 3-6 are fragmented cross sectional end views of various non-limiting embodiments of the invention of sidewalls used to provide the enclosures.

The arrangement in FIG. 3 shows plate member 80 without a peripheral sidewall and the shaping rail 82 having a peripheral sidewall 84 having a height sufficient to form the enclosure 86 when the upper mold 88 and lower mold 90 are in the bending and/or shaping position. In another non-limiting embodiment shown in FIG. 4, plate member 92 of the upper mold 93 has a continuous groove 94, and the shaping rail 96 of the lower shaping mold 98 has a peripheral sidewall 100 having a thickness to fit into the groove 94 of the plate member 92 to form an enclosure (not shown in FIG. 4).

Figure 4:
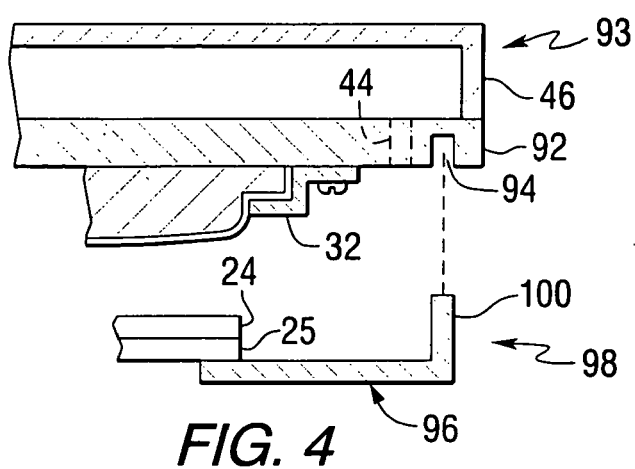

As is appreciated by those skilled in the art, the lower ring or outline mold, e.g. lower mold 22 in FIGS. 1 and 2, lower mold 82 in FIG. 3 and lower mold 98 in FIG. 4 is positioned by the carriage 51 so that the lower mold's geometric center is generally aligned with the geometric center of an upper shaping mold, e.g. upper mold 20 in FIGS. 1 and 2, upper mold 88 in FIG. 3 and upper mold 93 in FIG. 4 when the lower ring or outline mold occupies a pressing position, as discussed in more detail below. To more accurately vertically align the geometric center of the upper mold with the geometric center of the lower outline mold 22, the sidewall(s) and/or molds are provided with an alignment arrangement. In FIG. 4 the aligning arrangement includes the peripheral sidewall 100 of the lower mold 98 and the groove 94 in the plate member 92 of the upper mold 93.

Figure 5:
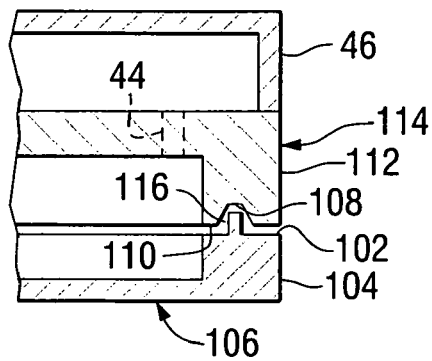

With reference to FIG. 5, there is shown another non-limiting aligning arrangement of the invention. In FIG. 5, surface 102 of continuous peripheral sidewall 104 of lower ring or outline mold 106 is provided with a continuous or non-continuous ledge 108, and surface 110 of peripheral sidewall 112 of the upper mold 114 is provided with a continues or non-continuous groove 116. The groove 116 preferably, but not limiting the invention thereto, has an inverted cone shape to seat the ledge 108 when the upper and lower mold 106 and 114, respectively, are moved toward one another to move the surfaces 102 and 110 of the sidewalls 104 and 112, respectively into contact with one another.

Figure 6:
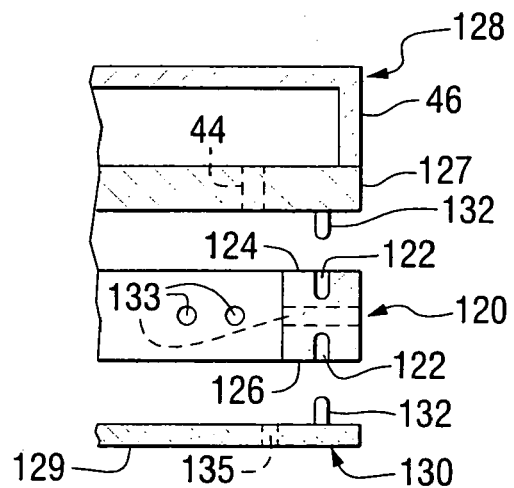

The peripheral sidewall(s) of the enclosure does (do) not have to be mounted on the upper and/or lower molds. More particularly and as shown in FIG. 6, a non-limiting embodiment of the invention includes a peripheral ring 120 provided with pin receiving holes 122 in upper and lower surfaces 124 and 126, respectively mounted at a pressing station. Plate member 127 of upper mold 128 and shaping rail 129 of the lower mold 130 are provided with pins 132 that move into the holes 122 of the ring 120 when the lower and upper molds are moved toward one another to provide an enclosure.

As is now appreciated, the aligning arrangements discussed above are not limiting to the invention; more particularly, pins and ridges disclosed on the lower mold may be used on the upper mold. Further, other embodiments of alignment pins or other well-known type of alignment arrangements well known in the art are used to position the upper mold relative to the lower ring or outline mold during the pressing operation to be discussed below.

As is now appreciated, the passageways for pulling air from the enclosure do not have to be provided through the plate member, e.g. the plate member 30 (FIG. 2) or the plate member 127 (FIG. 6). For example, but not limiting to the invention, the passageways can be provided through a peripheral sidewall, e.g. but not limiting to the invention, the passageways 133 in the sidewall 120 shown in FIG. 6 or through the lower mold, e.g. but not limiting to the invention, the passageways 135 in the lower mold 130 shown in FIG. 6. A plenum (not shown) can be mounted on the outer surface of the sidewall 120 or 135 as needed. The plenum can be similar to the plenum 46 provided for the passageways 44 of the upper mold 128 shown in FIG. 6.

With reference to FIGS. 7-9, non-limiting embodiments of the invention will be discussed using an articulating shaping ring or outline mold to shape the sheets 24 and 25. Upper mold 140 shown in FIG. 7 includes the plenum 46 having the conduit 48 connected thereto and shaping member 142 having press surface 144 covered with the fabric 50 held in position in any convenient manner, e.g. by clamps 146. Articulating ring or outline mold 148 includes a ring support member 150 having a plurality of upright adjustable members 152 supporting a pair of spaced central rails 154 (only one shown in FIG. 7). End rails 156 and 158 are pivotally mounted at pivots 160 and 161, respectively. Articulating shaping outline molds are well known in the art and no further discussion is deemed necessary regarding the connection of the end rails; however, for a more detailed discussion of articulate shaping outline molds reference can be had to U.S. Pat. No. 4,597,789, which patent disclosure is hereby incorporated by reference.

As is known in the art, flat glass sheets 24 and 25 are placed on the articulate ring mold 148 with the end rails 156 and 158 held down in the horizontal or sheet receiving position (end rails 156 and 158 in the sheet receiving position shown in solid lines in FIG. 7) by the rigidity of the sheets 24 and 25. As the sheets are heated, e.g. in a manner discussed below, the sheets soften and counter weights 163 and 164 raise the end rails 156 and 158, respectively (end portions of the raised end rails 156 and 158 shown in dotted lines in FIG. 7). The sheets 24 and 25 are now supported on the sheet shaping surface (see FIGS. 8 and 9) of the end rails 156 and 158 and central rails 154 of the ring mold 148. As the ring mold 148 is raised, in a manner discussed below, peripheral wall portions 166 of the ring mold 148 engage peripheral portions 168 of the press surface 144 (the engagement shown in dotted lines in FIG. 7). The end rails and central rails, the glass sheets supported on the end rails and central rails and the press surface of the upper mold form an enclosure 170. Air is pulled from the enclosure 170 through passageways 172 passing through the plate member 174 and the press surface 144 to bias the sheets 24 and 25 against the fabric 50 on the press surface to shape the sheets as previously discussed.

As can be appreciated, in the practice of the invention, it is preferred that the sidewall be continuous to reduce the load on the vacuum equipment, however, the invention is not limited thereto and the sidewall need not be continuous. More particularly, the sidewall of the articulating mold has breaks at the pivot points 160 and 161 and is therefore non-continuous. In the practice of the invention, the spacing between the end rails 156 and 158, and central rails 154 at the pivot points 160 and 161 can be sized to reduce air leakage during the pulling of air from the enclosure 170. Although not limiting to the invention, spacing in the range of about ⅛ to ¼ inch (0.32 to 0.64 centimeters) are acceptable in the practice of the invention. As can be appreciated, additional metal can be added to overlap on mold closure and effectively eliminate the spacing.

With reference to FIGS. 8 and 9, in non-limiting embodiments of the invention, the shaping rails of an articulating or fixed rail shaping molds can have an "I" beam supporting rail 176 as shown in FIG. 8, or a "T" shaped supporting rail 178 as shown in FIG. 9. With specific reference to FIG. 8, the peripheral wall 166 has one side 179 secured to the "I" beam shaping rail, e.g. the central rails and the end rails of the articulate shaping mold and fixed rail of the fixed rail shaping mold, below sheeting supporting end 180 of the "I" beam shaping rail and the other side 182 for engaging and biasing the fabric against the press surface 144 as shown in FIG. 8, or for engaging the plate member 80 as shown in FIG. 3, to provide the enclosure. The peripheral wall 166 shown in FIG. 8 has a generally "L" shaped cross section, however, as can be appreciated, the cross sectional shape of the wall 166 is not limiting to the invention, e.g. in another non-limiting embodiment of the invention the wall 166 in cross section has a radius as shown in phantom in FIG. 8.

Referring now to FIG. 9, horizontal member 184 of the "T" shaped supporting rail 178 supporting the glass sheets 24 and 25 has an extension 186 that engages and biases the fabric 50 against the press surface 144 to provide the enclosure 170.

As can now be appreciated, the invention is not limited to the manner in which the lower outline mold and/or the upper mold are fabricated, and the dimensions of the components of the molds provide an enclosure as discussed above from which a vacuum is pulled. For example, in one non-limiting embodiment of the invention, the shaping rail and sidewalls are formed from ⅛ inch stainless steel bar with the sidewalls welded to the shaping rail. In another non-limiting embodiment, the rails and sidewalls are integral and formed from ⅛ inch stainless steel sheet, with the edge of each sidewall designated to engage the cloth covered plate member or press surface. Further ⅛ inch stainless steel bar can be cut, folded or otherwise formed to provide the desired elevational contours for the sheet supporting surface of the shaping rail.

Further, as can be appreciated, the arrangements of extensions added to fixed shaping rail ring mold and the articulate shaping ring mold shown in FIGS. 1-9 to provide the sidewalls are interchangeable with one another to form the enclosure from which air is withdrawn to bias the sheets against the cloth covered press surface of the upper mold.

Figure 10:
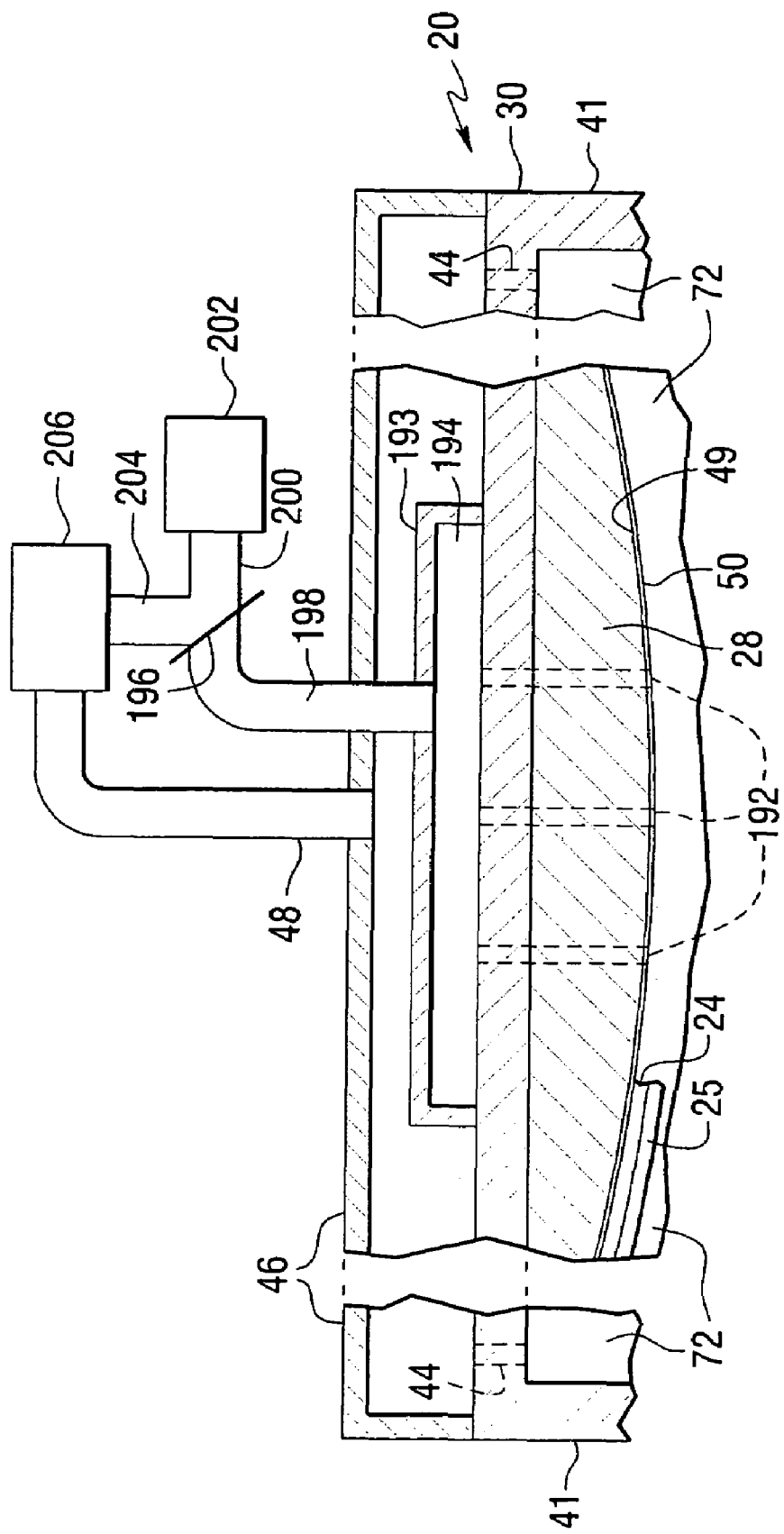
FIG. 10 is a fragmented cross sectional end view of the upper mold showing a non-limiting embodiment of the invention to, among other things, pull air through, and to move pressurized air through, the shaping member of the upper mold.

With reference to FIG. 10, to assist in the removal of air from the enclosure to bias the sheets against the press face 49 of the upper mold 20 (also see FIG. 2), passageways 192 may be provided in the shaping member 28 to pull air through the shaping member 28 to remove air from between the press face 49 and the glass sheets 24 and 25, e.g. upper surface of the sheet 24. A concern with having holes in the press face through which a vacuum is pulled is that the glass sheets, in particular the upper surface of the sheet 24, may have hole markings in the glass surface. In one embodiment of the invention, hole markings are eliminated by having the passageway openings in the press face equal to or less than the openings in the weave of the cloth or wire mesh or fabric 50 covering the press face 49. For example, passageways having a diameter of about 0.020 inch or less used with stainless steel knitted press cloth #3KN/C3 commercially available from Bekaert Fibre Technology, Marietta, Ga. is not expected to leave any visible hole markings on the glass surface, e.g. upper surface of the glass sheet 24.

In the instance where the passageways 192 in the shaping member are used only to pull a vacuum between the glass sheets and the press face, the passageways 192 can extend into the plenum 46 and be operational with the passageways 44. In the instance where the passageways 192 are to be used in separate process operations, e.g. to pull a vacuum or to move pressurized air to move the glass sheets away from the press face, other fluid flow arrangements should be made. More particularly, a non-limiting fluid flow arrangement is shown in FIG. 10 to pull a vacuum or move pressurized air, preferably heated pressurized air to prevent chilling and fracturing the shaped glass sheets through the passageways 192. With continued reference to FIG. 10, a subplenum or second plenum 193 is mounted within the plenum 46 and overlays a portion of the plate member 30 of the upper mold 20 having the passageways 192. With this arrangement, the passageways 44 passing through the plate member 30 provide communication between the interior of the plenum 46 and the enclosure 72 of FIG. 2 or 170 of FIGS. 8 and 9 as previously discussed. The passageways 192 extend from the press face 49, through the shaping member 28 and plate member 30 to interior 194 of the subplenum 193 to provide communication between the interior 194 of the sub plenum 193 and the enclosure 72. More particularly, when the sheets are against the press face of the shaping mold, the passageways 192 evacuate air between the press face and the sheets. The use of pressurized air to move the sheets away from the covered press face is advantageous when the upper major surface of the glass sheets contacting the fabric 50 includes a ceramic paint border or other decorative pattern and the paint tends to stick to the fabric 50.

As shown in FIG. 10, the subplenum 193 is connected to a two way valve 196 by a conduit 198. The two-way valve 196 is connected by a conduit 200 to a pressurized air supply 202, preferably a heated pressurized gas system, and by conduit 204 to vacuum equipment 206, e.g. a vacuum pump or a vacuum blower. The conduit 48 connected to the plenum 46 is also connected to the vacuum equipment 206. In one non-limiting embodiment of the invention, during the sheet pressing operation, vacuum is pulled through the conduit 48, plenum 46, passageways 44 and enclosure 72, as previously discussed, and vacuum is pulled through the conduit 204, the valve 196, the conduit 198, the subplenum 193, the passageways 192 and the enclosure 72. After the sheet pressing operation, the vacuum equipment 206 is shut off or disconnected from the conduits 48 and 204, and the valve 196 moved to connect the conduit 198 to the conduit 200 and the heated pressurized air supply 202 to move pressurized air through the conduit 200, valve 196, conduit 198, subplenum 193 and passageways 192 to move the shaped sheets away from the press face 49. As can be appreciated, the plenums 46 and 193 can be connected to separate vacuum source to apply different vacuum levels to the plenums.

As is appreciated, the area covered by the subplenum 193 and the passageways 192 is not limiting to the invention and is a function of the area of the press face 49 of the shaping member 28 to be worked on, e.g. the area to be put under vacuum or under air pressure. Further the invention is not limited to the pressure and/or temperature of the air moving through the passageways 192. The pressure should be sufficient to break any vacuum or adhesion between the shaped glass sheets and the press face. Although not required, the air directed through the passageways 192 to move the sheets away from the press face 49 is preferably heated so as to avoid any thermal shock to the glass sheets resulting from contacting them with air at a temperature below that which it was exposed to prior to heating, e.g. but not limiting the invention thereto, the temperature should be high enough to prevent chilling and/or fracturing of the shaped glass sheets, e.g. 538° C. (1000° F.). Furthermore, the pressurized air temperature can be used to cool the glass sheets to their non-heat deformable state. In one non-limiting embodiment of the present invention, the air is heated to a temperature of 371° C. to 621° C. (700° F. to 1150° F.).

As can be appreciated, the invention is not limited to the size of the opening of the passageways 44 and 192, and the manner in which the passageways 44 and 192 are provided in the upper mold. For example, the passageways 44 which are used to pull vacuum from the enclosure are sized to provide a lower pressure between the press face and upper glass sheet 24, and between the glass sheets 24 and 25, to move and bias the glass sheets against the covered press face as previously discussed. The rate of flow pulled by the vacuum through the passageways and chamber will equal the rate of air moving into the enclosure at steady state, e.g. through the separations in the end potions and center portion of articulated ring molds, through the gap between the glass sheets and shaping rail as the sheets are biased against the press member and air moving in through the periphery of the shaping rail and the upper mold. In the practice of the invention, a vacuum of −40 inches of water was pulled through passageways having a diameter of ¼ inch (0.64 centimeters ("cm")) and on a center to center spacing of 1.0 inch (2.54 cm). The passageways 44 can be made through the shaping member, e.g. shaping member 28 and the plate member, e.g. the plate member 30 using the any convenient drilling technique.

The passageways 192 through the shaping member in the area of the central portion of the sheets to be shaped are sized to prevent marring the glass sheet surface, e.g. hole marks in the sheet surface when vacuum pulled through the passageways to biases the portion of the sheet between the sheet periphery against the covered press face. In one non-limiting embodiment the size of the openings of the passageways 192 at the press face are equal to or less than the opening in the weave of the cloth covering the press face. For example, a hole opening of 0.020 inch is acceptable for use with a fabric including two layers of fiberglass press cloth #S-1NS7L90062301 commercially available from GlassTech, Perrysburg, Ohio, sandwiched between two layers of stainless steel knitted press cloth #3KN/C3 commercially available from Bekaert Fibre Technologies, Marietta, Ga. to prevent hole markings on the glass surface.

Figure 11:
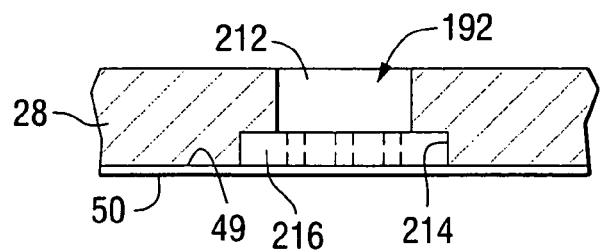
FIG. 11 is a fragmented cross sectional view showing a non-limiting embodiment of an upper mold having passageways passing through the shaping member of the upper mold in accordance with the disclosure of the invention.
Figure 12:
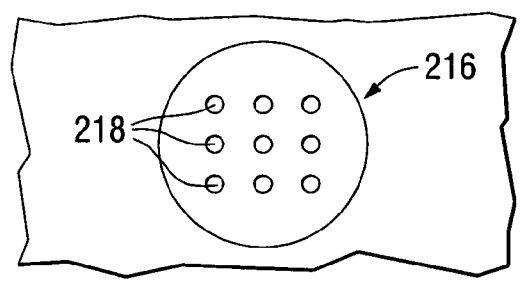
FIG. 12 is a fragmented cross sectional view of the press face of the mold shown in FIG. 11.

The passageways 192 can be provided in the shaping member in any manner. For example, in one non-limiting embodiment, the passageways 192 having a diameter of 0.020 inch can be drilled through the plate member and shaping member, e.g. but not limiting to the invention using the technique known as electrical discharge machining. With reference to FIGS. 11 and 12, in another non-limiting embodiment, a pair of holes 212 and 214 having concentric centers is drilled in the upper mold 20. The hole 212 having a smaller diameter, e.g. 1¼ inches (3.16 cm.) than the hole 214 extends through the plate member 30 and the shaping member 28 terminating about 0.10 inch (0.24 cm.) from the press face 49. The hole 214 having a diameter of 1½ inches (3.81 cm.) extends from the end of the hole 212 to the press face 49. A plate 216 (clearly shown in FIG. 12) has a plurality of holes 218 having a diameter of 0.020 inch is secured in the hole 214 in any manner, e.g. by a friction fit or a groove and tab arrangement. The surface of plate 216 is then lightly machined to conform to the surface profile 49 (see FIG. 10). As can be appreciated, the invention is not limited to the number of passageways 192 in the upper mold and the number and spacing depend on the amount of vacuum to be pulled and/or pressure moved through the passageways to move the sheets away from the press face. Further, the passageways 192 may be strategically placed to pull vacuum from between the press face and the glass sheets in areas of the sheets that have deep or S shape bends or sheets that have painted surface portions. The amount of air pulled by the vacuum through, or pressurized air moved through, the passageways 192 is not limiting to the invention and the amounts are selected to remove trapped or slow moving air from between the sheets or to break a vacuum or adhesion holding the sheet to the covered press face.

As can be appreciated, a plurality of the passageways 192 can be used to pull a vacuum at deep bend positions on the press face and not pull a vacuum at positions on the press face where the glass sheet has a painted area. To assist in moving the sheet away from the press face, pressurized air can be moved through the passageways at the deep bend positions on the press face and at the positions on the press face where the glass sheet has the painted area.

Figure 13:
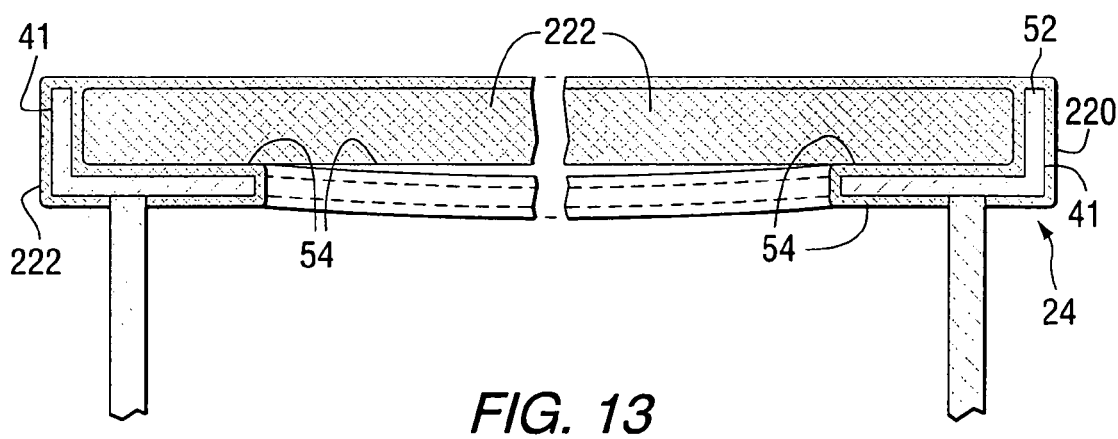
FIG. 13 is a fragmented cross sectional end view of the lower mold having a mesh wire over the surface of the lower mold in accordance with the disclosure of the invention.

As shown in FIG. 13, the glass support surface 54 of the shaping rails 52 can be covered with one or more layers of soft, heat-resistant, flexible fabric or metal cloth 222 that does not mark the hot glass sheets while supported on the shaping rails 52 of the lower mold 24 or during the press bending operation, as will be discussed later in more detail. The flexible fabric further provides a compliant support between the bottom surface of the glass sheet 25 and the support surface 54 of the rails 52 to form a gasket or seal that limits the air from being pulled between the outer marginal edge portions of the lower sheet 25 and the supporting surface 54 of the shaping rail 52 as a vacuum is applied to the plenum 46 and/or subplenum 193 during the bending operation. The fabric 222 also provides an insulating surface between the glass sheets and supporting surface of shaping rails 52 to slow the rate of conductive heat transfer between them. The fabric is wrapped around and secured to the outer surface of the continuous peripheral sidewalls 41 to ensure that the support surface 54 is fully covered. In one non-limiting embodiment, rather than simply covering the support surface 54 of the shaping rails 52, the fabric extends across the entire open portion of the lower mold defined by the inner periphery of the shaping rails 52. The fabric can be pulled taut or be allowed to sag in the space below the center potion of the sheets. More particularly, when the bending operation includes sag bending of the glass sheets before press bending, the fabric is allowed to sag. In one non-limiting embodiment of the invention, the fabric includes one layer of fiberglass press cloth #S-1NS7L90062301 commercially available from GlassTech, Perrysburg, Ohio, covered by one layer of stainless steel knitted press cloth #3KN/C3 commercially available from Bekaert Fibre Technologies, Marietta, Ga.

As is appreciated by those skilled in the art, the glass sheets 24 and 25 can be heat softened in any manner prior to the bending and/or shaping of the sheets. In the following non-limited embodiment of the invention the glass sheets are heated, shaped and annealed in heating, shaping and annealing lehr 230 shown in FIGS. 14A and 14B. The lehr 230 begins upstream at a loading zone 232 and includes a heating zone 234 of tunnel type configuration, a gravity bending zone 236 downstream of the heating zone 234, a press bending or shaping station 238 immediately beyond the gravity bending zone 236, an annealing zone 240 which can include a door 242 to provide access to the press station 238 and a door 243 (see FIG. 15) beyond the shaping station 238 and a cooling zone 244 in end to end relation in the downstream portion of the lehr. An unloading portion 246 is beyond the cooling zone 244. It should be appreciated that the present invention is not limited to the particular type of lehr discussed above and can be used in combination with other types of lehr, e.g. box-type lehrs, wherein a plurality of separate containers or boxes, each enclosing supported glass sheets, that proceed through the lehr in a stop-and-go arrangement, as is well know in the art.

Figure 14:
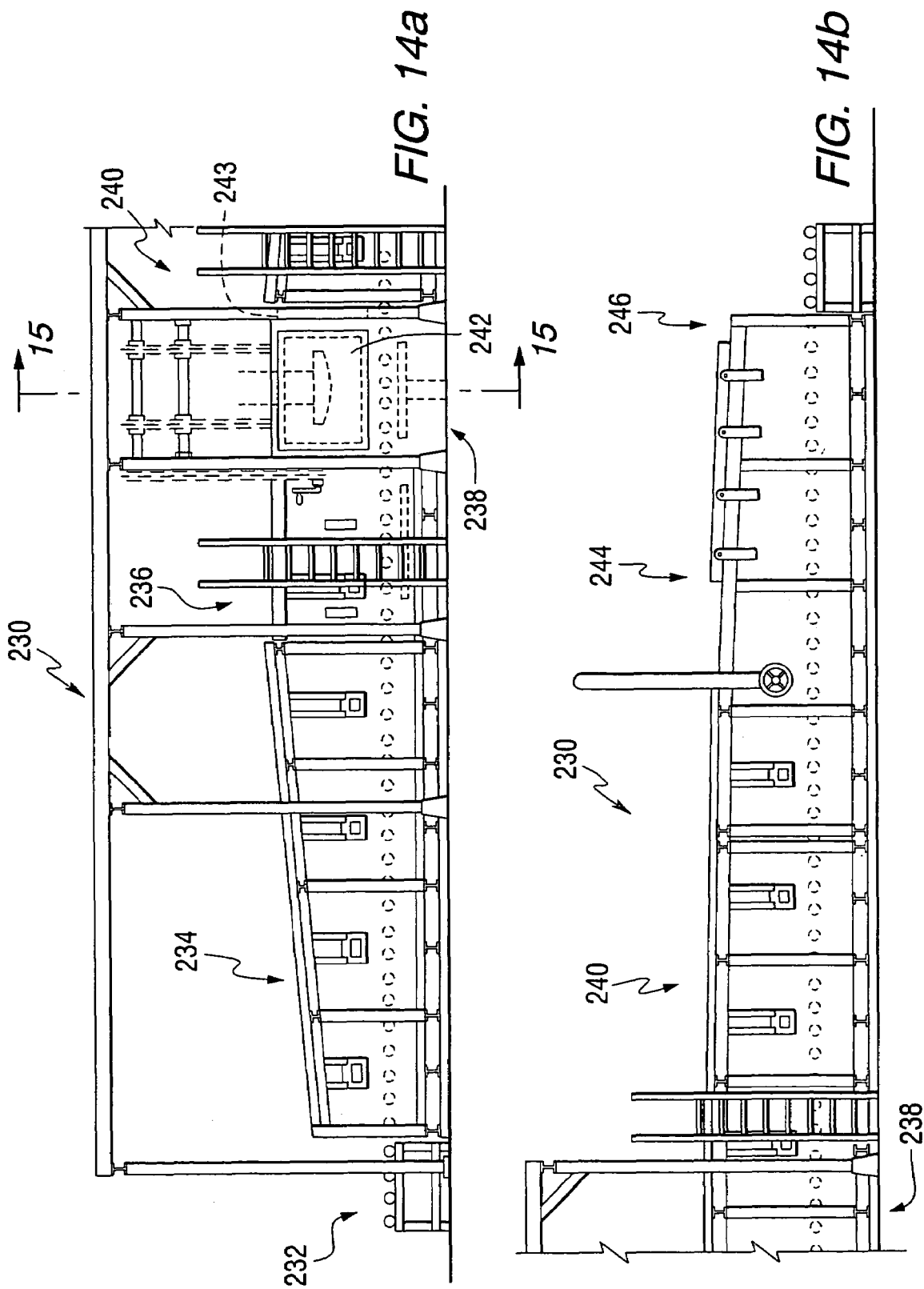
FIG. 14, which includes
Figure 15:
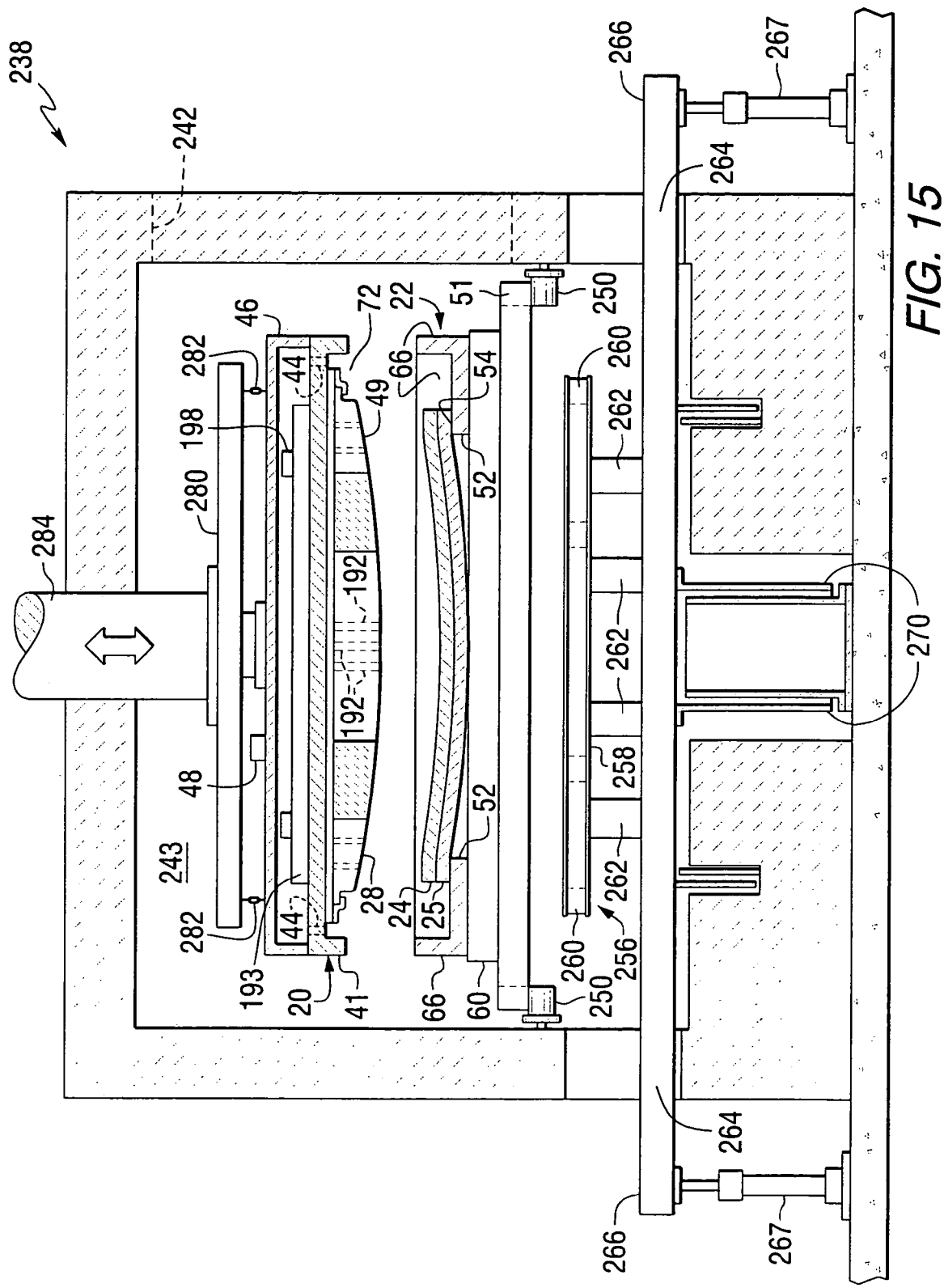
FIG. 15 is a view taken along line 15-15 of FIG. 14A showing a transverse elevation of the press bending station of the lehr arrangement shown in FIG. 14 which incorporates features of the present invention and includes a non-limiting embodiments of a lower outline mold depicted in its lowered position and a full surface upper mold.

Referring to FIGS. 14 and 15, a conveyor comprising a plurality of pairs of stub rolls 250 disposed in transversely opposing, longitudinally spaced relation, extend the entire length of the lehr 230 and define a path of movement through the lehr 230 along a longitudinal reference line. Each stub roll 250 is mounted on a shaft (not shown) that extends through a sidewall of the lehr and is connected to a conveyor drive (not shown). A mold return conveyor (not shown) extends along the entire lehr. The conveyor can be divided into a number of sections driven by their own drive means through a conventional drive rod and gear means or chain drives or the conveyor sections can be driven from a common drive through clutches in a manner well known in the art. A plurality of the mold support carriages 51 (only one shown in FIG. 15) are conveyed along the conveyor by rotational engagement of the stub rolls 250.

With continued reference to FIG. 15, the lower ring or outline mold 22 is mounted on the carriage 51 by the cross members 60 positioned under the shaping rail 52 (also shown in FIG. 1). The shaping rail 52 conforms in elevation and outline to the longitudinal and transverse elevational shape desired for the glass sheets 24 and 25 to be bent, slightly inboard of the glass sheet perimeter. The outline mold 22 illustrated in FIG. 15 has a continuous, fixed shaping rail, i.e. a continuous central portion and end portions (also see FIG. 1). However, if desired the lower mold 22 can be an articulating outline mold, e.g. of the type shown in FIG. 7. The outline mold 22 is positioned relative to the carriage 51 so that the geometric center of the lower or outline mold 22 is generally aligned with the geometric center of an upper shaping mold 20 when carriage 51 is aligned in the press bending station 238 and the outline mold 22 occupies a pressing position. As is appreciated, the sidewalls of the upper and/or lower molds can have the aligning arrangements shown and discussed for the non-limiting embodiments of the invention shown in FIGS. 4-6, can have either of the types of shaping rails shown in FIGS. 8 and 9, and can have combinations thereof. In the non-limiting embodiment of the invention shown in FIG. 15, the lower mold 22 is supported and secured to carriage 51 by the cross members 60 extending between the shaping rail 52 of the lower mold 22 and the carriage 51. The lower mold 22 is secured to the cross members 60 in any convenient manner. As is appreciated by those skilled in the art, when the bending and shaping process includes sag bending the marginal edges of the glass sheets are supported on the shaping rails, e.g. the shaping rails 52 and the center portion of the sheets are free to sag unobstructed under the force of gravity.

The sheet support surface 54 of the shaping rails 52 is covered with one or more layers of soft, heat-resistant, flexible fabric (not shown in FIG. 15, clearly shown in FIG. 13) that does not mark the hot glass sheets 24 and 25 while supported on the shaping rails 52 of the lower mold 22 or during the press bending operation.

With continued reference to FIG. 15, the press bending station 238 also includes a lifting frame 256. The frame 256 is positioned between and below stub rolls 250 and, in the particular embodiment shown in FIG. 15, has a grid-like configuration with a plurality of interconnected transversely extending beams 258 (one shown in FIG. 15) and longitudinally extending beams 260. Although not required, the openings in the frame between the beams can be filled with insulation (not shown). The frame 256 is secured to a series of posts 262 that are mounted to a lifting beam 264 positioned below frame 256. Although not limiting in the present invention, in the particular embodiment shown in FIG. 15, opposing ends 266 of the lifting beam 264 extend outside the press bending station 238 and are mounted on lifters 267 that raise and lower beam 264 and the lifting frame 256, which in turn engages and raises and lowers carriage 51 and the lower outline mold 22 during the press bending operation and moves them between a first position with the lower mold 22 spaced from the upper mold 20, and a second position with the sidewall 66 of the lower mold 22 in contact with the sidewall 41 of the upper mold 20 to provide the enclosure 72 (see also FIG. 2) and position a supported glass sheet or the sheets 24 and 25 against the covered press surface 49 of the shaping member 28 of the upper mold 20, as is discussed in more detail below. The vertical movement of the lifting beam 264 is preferable directed by guides, e.g. but not limiting to the invention, directed by guides 270. Without limiting the present invention, the lifters 267 can be a ball screw, hydraulic cylinder, or other type of linear actuator.

The press face 49 of the shaping member 28 of the upper mold 20 can be, for example, metal or ceramic. The press face 49 covers a continuous area whose outline is slightly larger than the outline of the glass sheets 24 and 25 to be shaped that are supported on the shaping rails of the lower mold 22. The downwardly facing press face 49 of the upper mold 20 is generally concave downward in elevation across the width of the lehr to conform to the longitudinal component of bend, i.e. the surface of the press face is convex and defines the desired glass surface contour about the periphery of the glass sheets 24 and 25 as well as the desired contours of the central region of the glass sheets. Depending on the complexity of the shape to be imparted to the glass sheets to be shaped, the press face 49 can further include an S-shaped bend component in elevation in the direction of the length of the lehr to conform to a desired transverse component of bend.

The press face 49 can be covered with one or more layers of heat resistant fabric 50 (shown in FIG. 2) that do not mark the hot glass sheets 24 and 25 during the press bending operation. Although not limiting in the present invention, in one non-limiting embodiment, the press face 49 is covered with one layer of fiberglass press cloth #S-1NS7L90062301 commercially available from GlassTech, Perrysburg, Ohio, covered by one layer of stainless steel knitted press cloth #3KN/C3 commercially available from Bekaert Fibre Technologies, Marietta, Ga.

In the non-limiting embodiment of the invention shown in FIG. 15, the upper mold 20 is suspended at the press bending station 238 from a support plate 280 by chains 282, and the deadweight of the upper mold 20 is used to press the glass sheets 24 and 25, as will be discussed later. The mold 20 is positioned such that its geometric center is generally vertically aligned with the geometric center of the outline mold 22 when carriage 51 is positioned within the shaping station 238. Alignment pins, or other well known type of alignment arrangement well known in the art, or of the type shown in FIGS. 4-6, are used to position the upper mold 20 relative to the lower or outline mold 22 during the pressing operation. An elongated rod, e.g. piston or pipe 284 connected to the support plate 280 moves the upper mold 20 between a raised position, e.g. the first position, with the upper mold 20 and lower mold 22 spaced apart from each other, and a lower position, e.g. the second position, with the sidewalls of upper mold 20 and lower mold 22 contacting one another to provide the enclosure. With the upper mold in the second position, the marginal edges of the sheets are biased by the support rail against the covered press face 49 of the shaping member 28. Although not limiting in the present embodiment, the elongated rod 284 can also be used to provide a positive downward force to the shaping member 28 of the upper mold 20 so that the pressing of the glass sheets is performed by a combination of the mold deadweight and the additional force applied by the elongated rod 284.

Cycle of Operation

In one non-limiting embodiment of the invention, a pair of glass sheets 24 and 25 of curved outline and with suitable parting material there between is positioned in a substantially horizontal orientation on the shaping rail 52 of lower outline mold 22 supported by carriage 51 at the loading zone 232 of the lehr 230 shown in FIG. 15. The area within the shaping rails 52 can be open or can have the fabric 222 (see FIG. 13) spanned between the rails 52 as discussed earlier. The carriage 51 is transversely aligned relative to a longitudinal reference line through the lehr 230. The carriage 51 passes through the heating zone 234 of the lehr 230, where the heating elements (not shown) are arranged to provide a pattern of heating both longitudinally and transversely of the path of travel for the lower mold 22 through the lehr 230. By the time the lower mold 22 arrives at press bending station 238 (maintained at an ambient temperature range of 1080° F. to 1150° F. [582° C. to 621° C.]), the glass sheets 24 and 25 have been heated to their deformation temperature (typically 1070° F. to 1125° F. [577° C. to 607° C.]) and sag by gravity to a preliminary configuration, with the periphery of the glass sheets 24 and 25 generally conforming to the elevational contours of rail surface of the central portion 56 and end portion 58 of the shaping rails 52. In the non-limiting embodiment of the invention where the lower mold 22 is an articulating mold, e.g. of the type shown in FIG. 7, the end rails 156 and 158 will have pivoted upward by the time the lower mold 22 enters the press bending station 238.

During the passage of the outline mold 22 from the loading zone 232 to the bending station 238, it may lose its proper alignment in orientation with respect to the longitudinal reference line. However, because the glass sheets generally have non-rectangular outlines of non-uniform curvature in plan and are bent to complicated shapes, it is essential that the outline mold 22 with the preliminarily shaped sheets 24 and 25 be oriented and aligned below the press face 49 of the shaping member 28 of upper mold 20 when the sheets arrive at the bending station 238. With reference to FIG. 15, upon arrival at the bending station 238, the support carriage 51 with the lower mold 22 positioned thereon is repositioned, if required, to generally align the geometric center of outline mold 22 and preliminarily shaped glass sheets 24 and 25 below the press face 49, which is in its raised position. Various types of alignment systems well known in the art, and alignment systems discussed herein, e.g. FIGS. 4-6 and combinations thereof, can be used to align the carriage 51 within bending station 178 and/or properly position the outline mold 22 relative to the upper mold 20. For example, but not limiting to the invention, the lower mold 22 as it moves into the bending station 178 on the carriage 51 can be generally aligned relative to the upper mold 20 and preciously aligned when the sidewalls of the upper mold and lower mold contact one another using the aligning arrangements shown in FIGS. 4-6 and combinations thereof. Limit switches (not shown) can be used to assure that the pressing operation will not continue unless the carriage 51 is properly positioned and aligned at the press bending station 238.

After the lower mold 22 with the glass sheets 24 and 25 supported thereon is properly aligned, the lifters 267 move the lifting frame 256 upward and into engagement with the carriage 51. The lifters 267 continue to raise the carriage 51 off the stub rolls 250 toward the press face 49 of the shaping member 28 of the upper mold 20. As the lower mold 22 is lifted, the piston 284 lowers the upper mold 20. As the lower mold 22 approaches the upper mold 20, the alignment arrangements, e.g. as shown in FIGS. 4-6 or other equivalent devices as are well known in the art, orient the suspended upper mold 20 with the lower mold 22, such that their geometric centers are aligned. The lower mold 22 and the upper mold 20 continue to move relative to each other until the shaping rail moves the marginal edge portions of the upper surface of the upper sheet against the covered press face 49, and the sidewall 41 of the upper mold 20 and the sidewall 66 of the lower mold 22 contact one another to form the enclosure 72 (see FIG. 2).

With the sidewalls of the upper and lower molds contacting one another and the marginal edges of the upper sheet 24 based against the covered press face by the shaping rail, vacuum is pulled in the enclosure 72 through the conduit 48, plenum 46 and passageways 44, and optionally through the conduit 198, subplenum 193 and passageways 192 (see also FIG. 10). As the air is pulled from the chamber 72, the negative pressure in the chamber 72 causes the air in the press station 238 to bias the lower surface of the glass sheet 25 to lift the center and edges of the glass sheets 24 and 25 against the press face 49 of the shaping member 28 of the upper mold 20 to complete the shaping of the glass sheets 24 and 25. The air between the sheets and the covered press face is/are pulled through the weave of the cloth.

After the sheets 24 and 25 are shaped, the pulling of the vacuum is discontinued and the sheets 24 and 25 drop onto the shaping rails 52 of the lower mold 22. Optionally heated pressurized air can be moved through the passageways 192 by connecting the conduit 198 to the heated pressurized air supply 202 (see FIG. 10). With the sheets on the shaping rails 52, the lower mold 22, lifting frame 256 and lifting beam 264 are lowered and carriage 51 is redeposited on stub rolls 250. Similarly, the upper mold 20 is raised to its initial or first position by piston 284. When the lower mold 22 is redeposited on stub rolls 250, the lehr door 243 opens, and the stub rolls 250 are activated to convey the shaped glass sheets 24 and 25, and the lower mold 22 out of the shaping station 238 and into the annealing zone 240. The door 243 is then closed for the next bending and shaping cycle.

It should be appreciated that the non-limiting embodiment of the invention discussed above avoids applying the pressing load to the stub rolls 250. More specifically, by using the lifting frame 256 to lift the carriage 51 off the stub rolls 250, the load applied to the lower mold 22 by upper mold 20 (and optionally piston 284) during pressing is transferred to the lifting beam 264 and lifters 267 rather than the stub rolls 250.

Once the glass sheets 24 and 25 have been shaped in the pressing station 238, it is necessary that they retain their conforming shapes in the annealing zone 240 until cooled from within the deformation temperature range to below the strain point of the glass, which for float glass is approximately 950° F. (510° C.). The maximum rate of cooling that avoids excessive permanent warpage between the glass sheets depends on, among other factors, the glass sheet thickness. After annealing, the glass sheets pass into a cooling zone 244 for additional cooling.

It should be appreciated that the movement of the upper and lower molds can be modified to provide other bending sequences. For example and without limiting the present invention, upper mold 20 can remain stationary and lifters 267 can be used to move the lower mold 22 and the glass sheets 24 and 25 upward a sufficient distance to press the glass sheets as discussed above. In another non-limiting alternative embodiment, piston 284 can be used to move the upper mold 20 downward while the lower mold 22 remains on the stub rolls 250.

Figure 16:
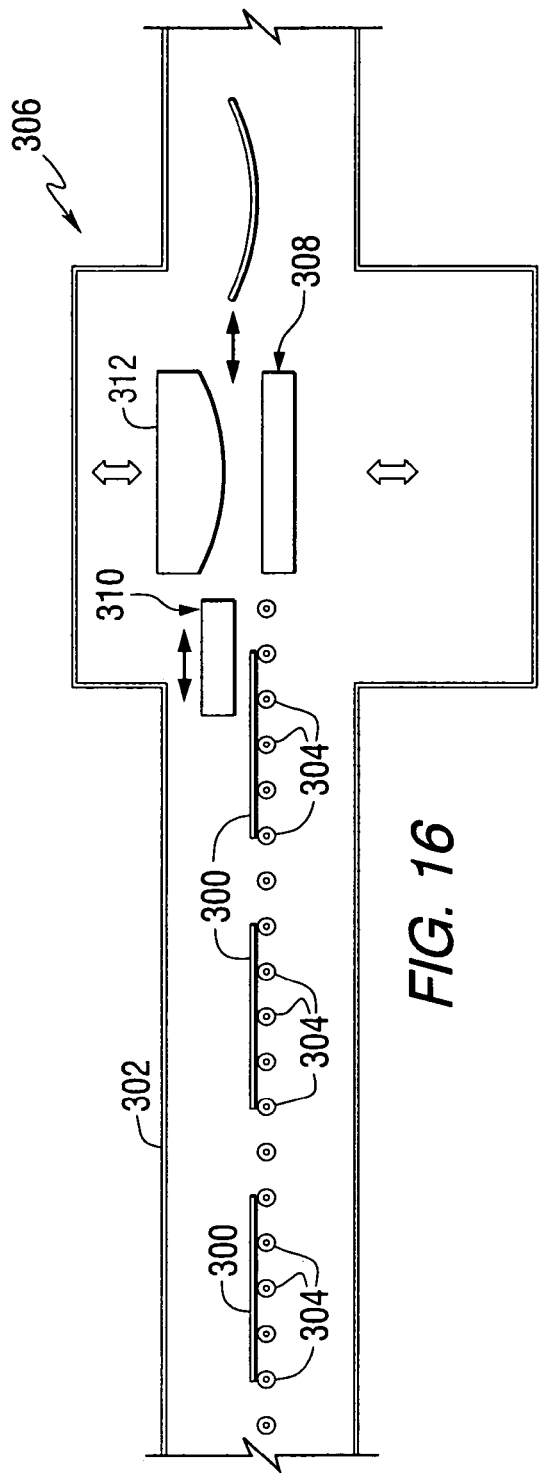
FIG. 16 is a longitudinal side view of an upstream arrangement of a glass sheet bending lehr in accordance with the present invention.

In the non-limiting embodiment of the invention shown in FIG. 16, single or stacked glass sheets 300 are conveyed through a furnace 302 on a series of conveyor rolls 304. When the heat softened glass sheets reach the shaping station 306, the sheets are transferred from the rolls onto a lower ring mold 308 in any usual manner, e.g. by a vacuum shuttle 310 optionally having a shaped engaging surface. The ring mold 308 is similar to the lower mold 22 shown in FIG. 1 or the lower mold 148 shown in FIG. 7. Thereafter the ring mold 308 and upper mold 310 similar to the upper mold 20 shown in FIG. 1 are moved relative to one another in any usual manner, e.g. as discussed for moving the molds 20 and 22 using the pressing station 238 shown in FIG. 15 to form the enclosure around the glass sheet. Thereafter the sheet is shaped using vacuum as previously discussed. After the sheets are shaped the sheets are removed from the lower mold 308 in any usual manner and controllably cooled, e.g. moving the shaped sheet through an annealing lehr.

Figure 17:
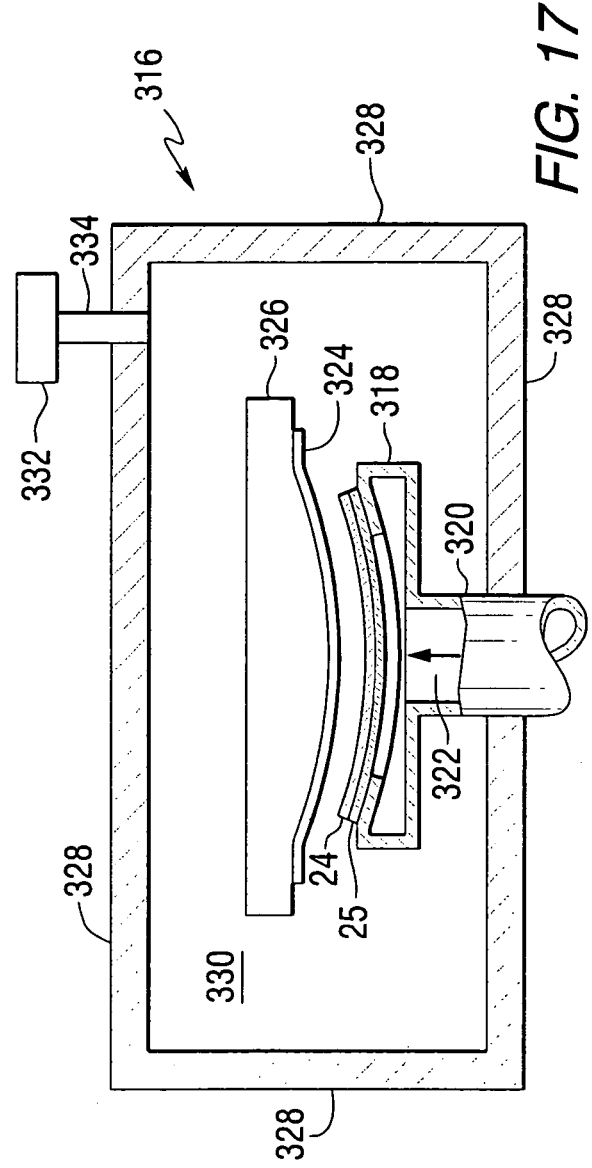
FIG. 17 is a view similar to the view of FIG. 2 showing another non-limiting embodiment of a pressing station in accordance with the disclosure of the invention.

With reference to FIG. 17, there is shown another non-limiting embodiment of the invention. In FIG. 17 pressing chamber 316 has shaping rails 318 mounted on a piston 320 having a passageway 322 through which ambient air is free to move. After the heat softened sheet(s) 24 and 25 are placed on the shaping rails 318 in any usual manner, the piston 320 moves the sheets upward to bias the marginal edge portions of the sheets against the cloth covered press face 324 of upper mold 326. The closed walls 328 and doors 330 (only one shown in FIG. 17) at the entrance and exit ends of the pressing station seals or minimizes movement of air into the pressing chambers 316. After the pressing chamber is sealed, the air in the pressing chamber 316 is pulled out by vacuum equipment 332 through conduit 334. Air pulled out of the chamber moves the air from between the sheet and from between the top sheet 24 and covered press face 324. Air in the passageway 322 of the piston biases the sheets against the covered press face 324 to shape the sheets. After the sheets are shaped, the vacuum equipment 332 is shut off and the piston 322 is lowered. After the piston 322 is seated the doors to the pressing chamber 322 are opened and the shaped sheets are removed from the shaping rails and the chamber 322 as the next set of sheets move into the chamber 322 and placed on the shaping rails.

As can be appreciated by those skilled in the art, the associated equipment and devices to move the sheets into the pressing station and to raise and/or lower the molds are removed from FIGS. 16 and 17 for purposes of clarity and any of the devices and lifting arrangements shown in FIGS. 1-15 and/or discussed herein may be used.

After the glass sheets are shaped they can be further processed in any convenient manner into residential and vehicular transparencies. For example, but not limiting the invention thereto, laminated in any convenient manner, e.g. as discussed in U.S. Pat. Nos. 4,367,107; 4,998,784 and 5,355,144, which patents are hereby incorporated by reference into automotive transparencies, e.g. automotive laminated windshields, and laminated sidelights and backlights.

The form of the invention shown and described in this disclosure represents illustrative non-limiting embodiments of the invention. It is understood that various changes may be made without departing from the teachings of the invention defined by the claimed subject matter that follows.

What is claimed is:

1. A sheet bending apparatus comprising:
a first shaping mold and an outline shaping mold defined as a second shaping mold, wherein
the second mold has a pair of spaced end rails and a pair of spaced central rails, the pair of spaced end rails and the pair of spaced central rails defining a boundary around an open area and portions of the end rails and the central rails providing a sheet supporting surface, and
the first mold, comprises a support plate and a plate member, the support plate having a perimeter, a first major surface and an opposite second major surface; the plate member having a perimeter, a first major surface and a second opposite major surface, wherein the first major surface of the plate member is in facing relationship to the first major surface of the support plate, wherein the plate member is secured to the first major surface of the support plate of the first shaping mold, and the second major surface of the plate member has a shaped press face, wherein the shaped press face is a convex surface of a solid and is in facing relationship to the sheet supporting surface and the open area of the second mold, and the perimeter of the plate member is a boundary of the shaped press face, wherein the boundary of the shaped press face is within, and spaced from, the perimeter of the support plate, and a plurality of passageways having a first end and an opposite second end, wherein the support plate has a marginal edge between the perimeter of the support plate and the boundary of the shaped press face, and the marginal edge surrounding the shaped press face, and the first end of each the plurality of passageways is at the marginal edge of the major surface of the first mold;

an outer wall having an inner surface, wherein the inner surface of the outer wall defines a boundary;

an elevator arrangement acting on at least one of the first and second molds to move the first and second molds and the outer wall relative to one another between a first position, wherein the first and second molds are spaced from one another and the outer wall is spaced from and out of contact with at least one of the first and second molds, and a second position, wherein the outer wall is in contact with the first and second molds to form an enclosure wherein the first shaping mold provides one side of the enclosure, the second mold provides an opposite side of the enclosure and the sheet supporting surface of the second mold and the first end of the plurality of passageways of the first mold are within the boundary defined by the outer wall, wherein the sheet supporting surface of the second mold is in facing relationship to the major surface of the first mold, and fluid communication between interior and exterior of the enclosure is provided through the open area, and the plurality of the passageways, and wherein with a sheet to be shaped in the enclosure, peripheral edge of the sheet to be shaped is spaced from the inner surface of the outer wall, and plenum over a portion of the second major surface of the support plate, wherein the second end of each one of the plurality of the spaced passageways in fluid communication with interior of the plenum.

2. The bending apparatus according to claim 1, wherein the end rails and the central rails of the second mold are continuous and form a continuous sheet supporting surface.

3. The bending apparatus according to claim 1, wherein the central rails are between the spaced end rails and the central rails are secured in position, and the end rails are pivotally mounted to pivot from a first position where the end rails and the central rails provide for a generally horizontal support to a second position where portions of the ends of the end rails are raised above the central rails.

4. The bending apparatus according to claim 1, wherein the outer wall is attached to the support plate of the first mold.

5. The bending apparatus according to claim 1, wherein the outer wall is attached to the second mold and surrounds the sheet supporting surface of the second mold.

6. The bending apparatus according to claim 5, wherein the central rails and the end rails have a "T" shaped cross section defined as a "T" rail with horizontal member of the "T" rail having the sheet supporting surface.

7. The bending apparatus according to claim 6, wherein the outer wall is attached to outer surface of vertical member of the "T" rail and extends away from the "T" rail and the open area.

8. The bending apparatus according to claim 6, wherein the outer wall is attached to the horizontal member of the "T" rail and extends away from the "T" rail and the open area.

9. The bending apparatus according to claim 6, wherein the sheet supporting surface is a portion of the horizontal member of the "T" rail adjacent the open area of the second mold and the outer wall is a portion of the horizontal member of the "T" rail farthest from the open area.

10. The bending apparatus according to claim 5, wherein the central rails and the end rails have an "I" shaped cross section defined as an "I" rail and upper end of the "I" rail is the sheet supporting surface of the second mold and the outer wall is securely attached to an outer vertical surface of the "I" rail and extends away from the "I" rail and the open area.

11. The bending apparatus according to claim 1, wherein the outer wall has one part of an aligning arrangement and the first mold and/or the second mold has another part of the aligning arrangement.

12. The bending apparatus according to claim 1 further comprising a pressing station having an upstream end and a downstream end, a heating furnace connected to the upstream end of the pressing station, a cooling furnace connected to the downstream end of the pressing station and a conveying system extending through the heating furnace, the pressing station and the cooling furnace to move the second mold along a path through the heating furnace, the pressing station and the cooling furnace wherein the first mold is mounted in the pressing station and the elevator arrangement moves the first mold toward and away from the path.

13. The bending apparatus according to claim 1 wherein the open area is closed when the first and second molds are in the second position and at least one sheet is between the shaped press face of the first mold and the supporting surface of the second mold whereby removal of air from interior of the enclosure through the at least one passageway increases air pressure in the open area below the at least one sheet to bias the at least one sheet against the press face of the first mold.

14. A sheet bending apparatus comprising:
a first shaping mold having a major surface, a perimeter, a portion of the major surface within and spaced from the perimeter comprising a shaping member having a predetermined shaped press face; a first plurality of passageways having a first end in the major surface of the first shaping mold between the perimeter of the first shaping mold and the shaping member, and a second plurality of passageways having a first end at the shaped press face of the shaping member of the first shaping mold, wherein opposite second end of the first plurality of passageways is in fluid communication with a first chamber, and opposite second end of the second plurality of passageways is in fluid communication with a second chamber;
an outline shaping mold defined as a second shaping mold, the second mold having a pair of spaced end rails and a pair of spaced central rails, the pair of spaced end rails and the pair of spaced central rails defining a boundary around an open area, wherein portions of the end rails and the central rails provide a sheet supporting surface;
an outer wall between the first and second molds, inner surface of the outer wall defining a boundary;
an elevator arrangement acting on at least one of the first and second molds to move the first and second molds relative to one another between a first position, wherein the first and second molds are spaced from one another and the outer wall is spaced from at least one of the first and second molds, and a second position, wherein the first and second molds, and the outer wall form an enclosure, wherein the sheet supporting surface of the second mold and the first end of the first plurality of passageways are within the boundary defined by the inner surface of the outer wall, wherein the first shaping mold provides one side of the enclosure, and the second mold provides an opposite side of the enclosure with the sheet supporting surface of the second mold and the first end of the second plurality of passageways in facing relationship to one another, and ambient air is accessible to the enclosure at least through the open area of the second mold;
wherein the first plurality of passageways provide fluid communication between the first chamber and the interior of the enclosure; the second plurality of passageways provide fluid communication between the second chamber and interior of the enclosure, and each of the first end of selected ones of the second plurality of passageways has a first part and a second part, wherein the first part has an opening at the press face that has a shape and size at a surface of the press face that remains constant for a predetermined distance from the surface of the press face, and the second part has an opening that is smaller than the opening of the first part to provide a stepped recess in the press face, and
a plate having a plurality of spaced holes therethrough mounted in the stepped recess.

15. The sheet bending apparatus according to claim 14 wherein the second chamber is inside the first chamber and the first chamber is connected by a conduit to a vacuum pump and the second chamber is connected by a conduit to a valve having a first open position and a second open position with the valve in the first open position connected by a conduit to the vacuum pump and with the valve in the second position connected by a conduit to a pressurized fluid system.

16. The bending apparatus according to claim 15, further comprising a mesh cloth securely mounted over the shaped press face, the mesh cloth having a predetermined weave to provide openings of a predetermined size, wherein the size of the opening of the first end of the second plurality of passageways is equal to or less than the predetermined size of the opening of the weave of the mesh cloth overlying the opening of the first end of the second plurality of passageways.

17. The bending apparatus according to claim 14, further comprising a mesh cloth securely mounted over the press face of the shaping member, the mesh of the cloth having a predetermined weave to provide spacing of a predetermined opening, wherein the size of the opening of the holes in the plate are equal to or less than the size of the openings in the mesh cloth overlying the holes in the plate.

18. The sheet bending apparatus according to claim 14 wherein the first part is a circular hole having a first constant diameter and the second part is a circular hole having a second diameter smaller than the first diameter.

* * * * *